J. W. SAFFOLD.
SPRING SUPPORTED SYSTEM FOR VEHICLES.
APPLICATION FILED JAN. 20, 1914.
1,123,808.
Patented Jan. 5, 1915.
4 SHEETS—SHEET 2.
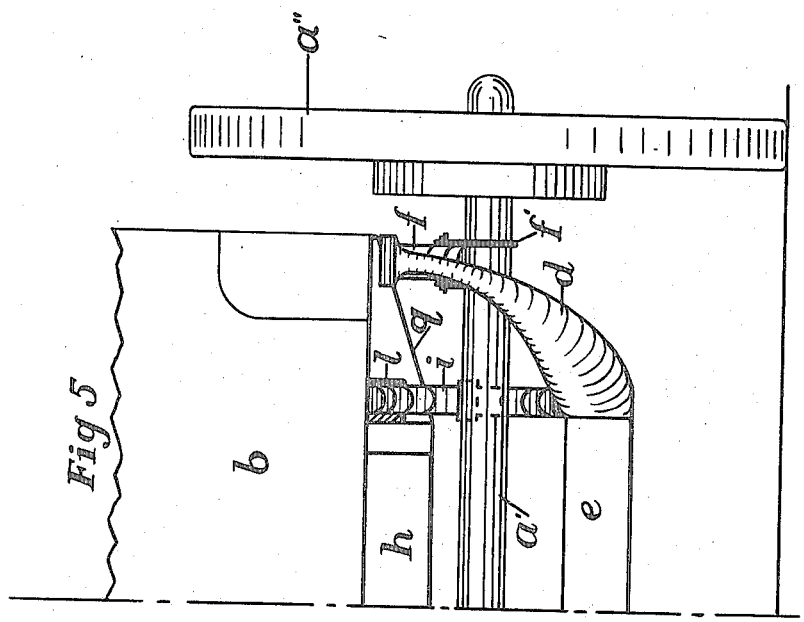
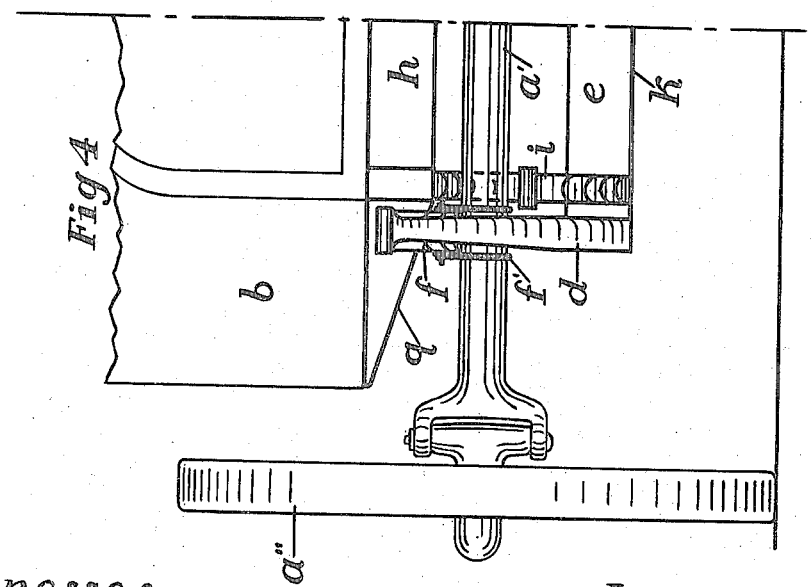
Witnesses
Geo. E. Tower
Chas. A. Ams.
Inventor
James Webb Saffold
per
Attorney

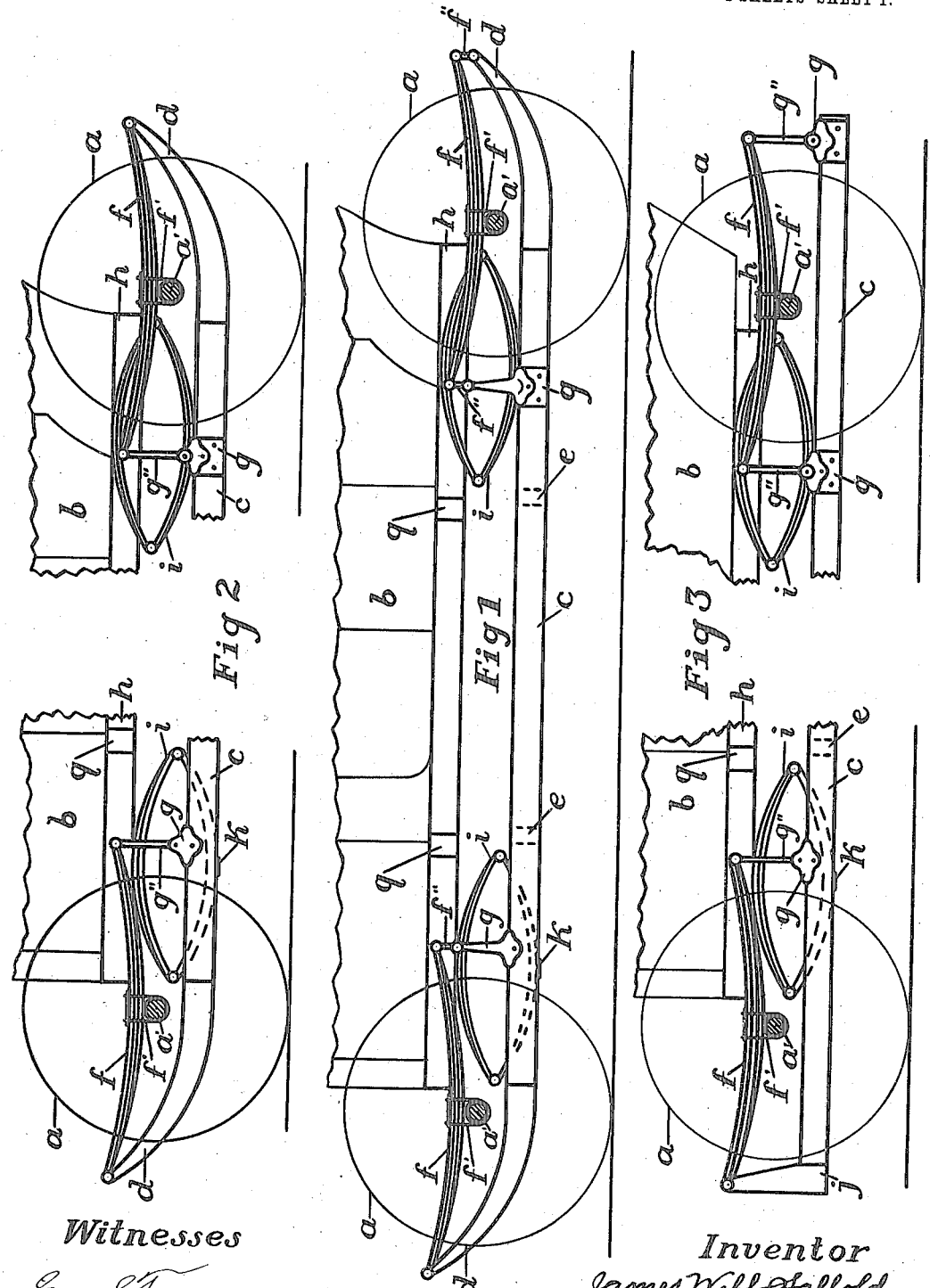

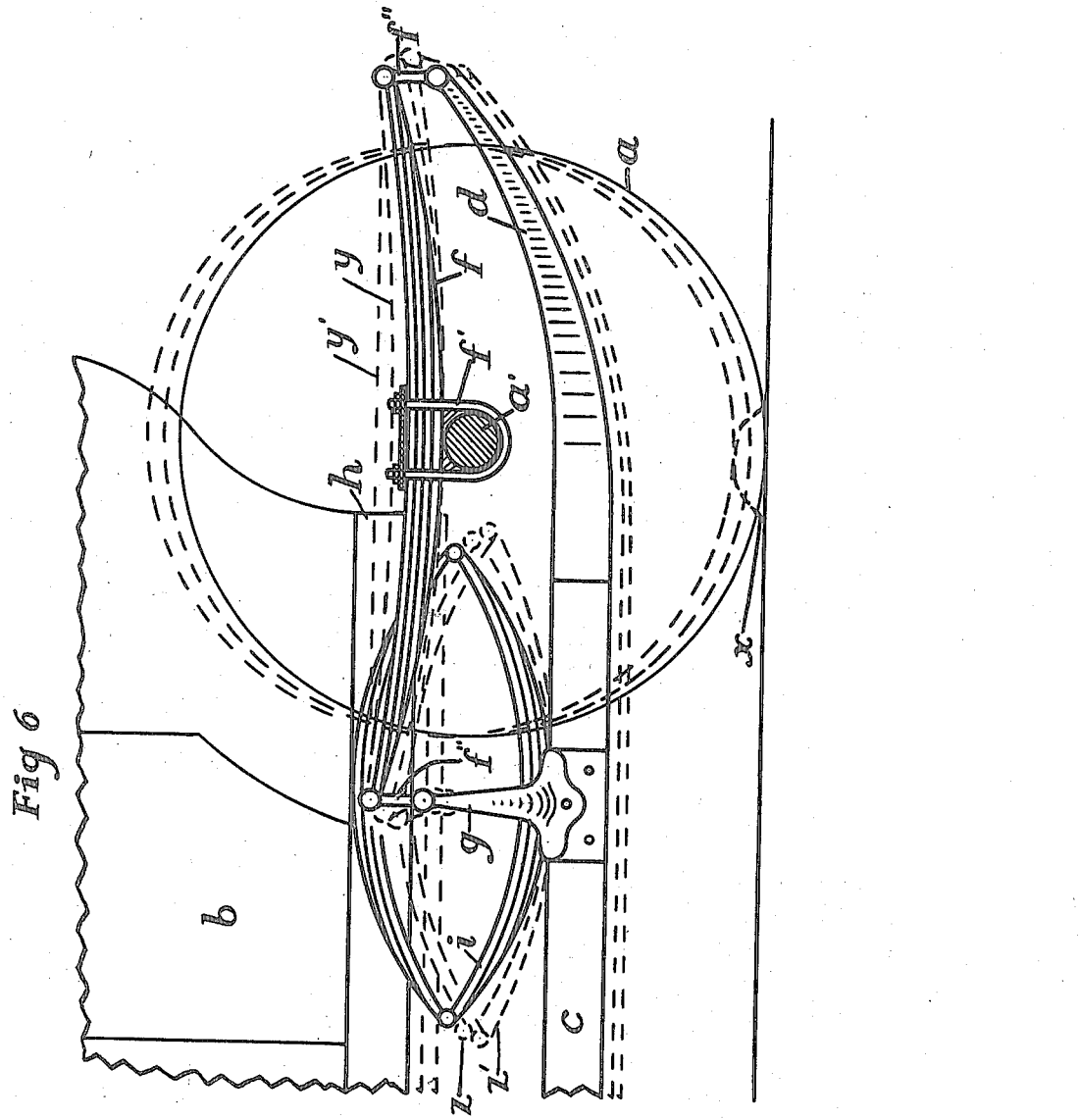

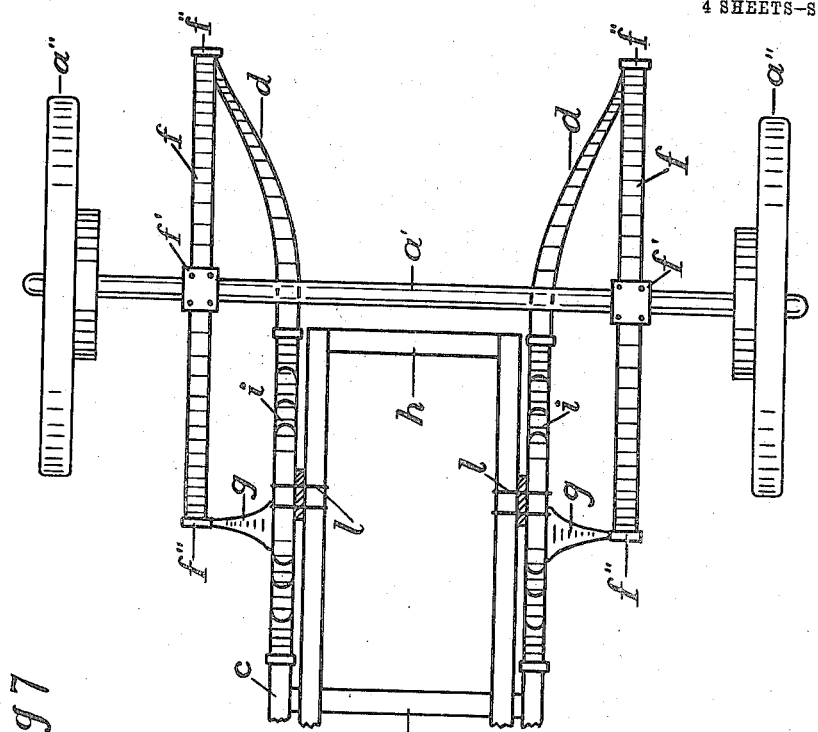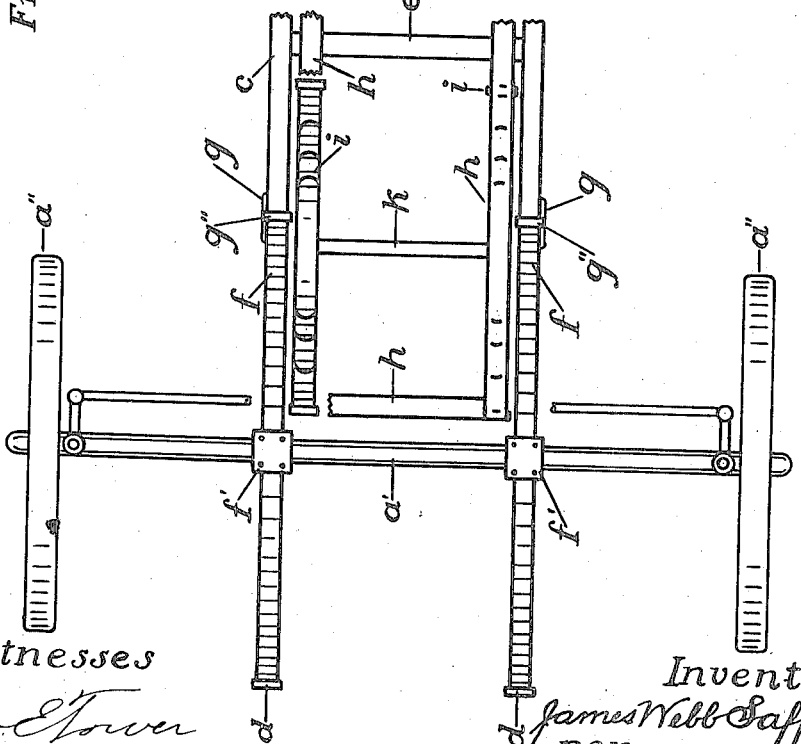

UNITED STATES PATENT OFFICE.

JAMES WEBB SAFFOLD, OF CLEVELAND, OHIO.

SPRING-SUPPORTED SYSTEM FOR VEHICLES.

1,123,808. Specification of Letters Patent. Patented Jan. 5, 1915.

Application filed January 20, 1914. Serial No. 813,343.

*To all whom it may concern:*

Be it known that I, JAMES WEBB SAFFOLD, a citizen of the United States, residing at Cleveland, in the county of Cuyahoga and State of Ohio, have invented certain new and useful Improvements in Spring-Supported Systems for Vehicles, of which the following is a specification.

My invention relates to improvements in spring-supported system for vehicles, and has for its object the provision of a system comprising two independent sets of springs and an interposed frame; all of suitable co-acting types, which shall compensate and distribute the shocks encountered by a traveling vehicle, such as an automobile.

There are originated, during the movement of any vehicle, two sets of shocks or strains of an entirely different character, which the ordinary spring-support fails adequately to accommodate and distribute. These comprise a relatively slow and gentle vertical movement, comparable somewhat to a wave motion, which is imparted by the body to the spring-support, while the wheels impart a rough and uneven vibratory motion to the axles and their supported springs. Recognizing the problem presented by these opposing forces, I have proceeded along the lines of individually meeting the two classes of vibrations by the means hereinafter explained.

The improvements of my invention will be more readily understood by making reference to the accompanying drawings wherein:—

Figure 1 is a view in side elevation of an automobile chassis constructed in accordance with my invention; the supported body being shown broken away, and the wheels in bare outline. Figs. 2 and 3 are similar views of modifications of my improved device; the central portions of the chassis and body also being broken away. Figs. 4 and 5 respectively, are fragmentary front and rear views in elevation, and upon a slightly larger scale, of the construction of Fig. 2; Fig. 6 is a view upon a still larger scale, illustrating by means of full and dotted lines, the respective vibratory motions imparted by the road and body to the spring-supported system; the modifications of Fig. 1 being shown in fragmentary side view, and Fig. 7 is a plan view of an automobile chassis constructed in accordance with my invention; said view being centrally broken away.

Throughout the several figures of the drawings, I have employed the same character of reference to indicate similar parts.

In the drawings, the circles $a$ represent the position of the wheels assumed to be mounted upon the axles $a'$, shown in cross-section, while the body $b$ is suitably carried by the spring-supported system of my invention. No details of these parts are shown, for the reason that my improvements, while primarily applicable to automobiles, are adapted for different classes of road vehicles.

Referring to Fig. 1, the frame $c$, preferably formed of wood, is provided with forged, upwardly curved terminals $d$, and is united by transverse cross-pieces $e$. I have adopted the wooden frame, by reason of its important function in distributing the vibration as well as its reduced weight, as compared with a metal frame, although my improvements are not necessarily limited thereto. The frame is of the "under-slung" type; being supported from the axles $a'$ by means of relatively long semi-elliptic springs $f$, secured to said axles by the clevises $f'$. Links $f''$ unite the rear springs with the bowed ends $d$ of the frame, while curved standards $g$ and links $f''$ intermediately mounted upon the frame, respectively serve to hang the frame from the ends of springs $f$. A secondary frame $h$ mounting the body $b$, is supported upon the frame $c$, by means of front and rear elliptic springs $i$. The front elliptic springs $i$, in turn, are supported from frame $c$, by means of the transverse strap or bar $k$. The rear springs $i$, rest directly upon the frame $c$ and are secured to frame $h$, by laterally-supporting clevises 1 (Fig. 7). The body itself is carried by front and rear bolsters $q$. Those skilled in the art will recognize that the elliptic springs are best adapted for accommodating the relatively slow vibratory movement of the body, and as these springs have no direct connection with the axles of the vehicle, the vibration imparted by the roadway is primarily met by the long semi-elliptic springs, which directly suspend the intermediate or primary frame of my improved construction.

The embodiment of Fig. 2 will be readily understood; conforming very closely, as it does, to the construction already described. The one difference which I may point out, is the provision of relatively long links $g''$, which permits the omission of the short links $f''$ for connecting the rear springs. In Fig. 3, these long links $g''$ are retained for the inner ends of the springs; being duplicated upon the rear springs as well. The frame is straight and is provided with front standards $j$ for engaging the forward springs. This last construction affords a somewhat longer wooden frame for the distribution of the various shocks and strains, and is best adapted for commercial vehicles. These modifications, however, are intended merely to indicate that certain deviations from my preferred construction may readily be made to adapt my improvements to different classes of vehicles.

In Figs. 4 and 5, I have shown the wheels $a$ provided with solid rubber tires $a''$, which may readily supplant the ordinary pneumatic tires with marked advantage, whenever my spring-supported system is employed. These views, also show the transverse bolster $k$ mounted upon the secondary frame, which serves intermediately to support the body of the car.

In Fig. 6, I have endeavored to show graphically the distribution of shock and vibration effected by my improved spring-supported system or resilient frame. In order to illustrate this, I have supplied an enlarged fragmentary view of the rear portion of the system, which is shown in normal relation by full lines, as in Fig. 1. The outline of the wheel $a$ is duplicated by dotted lines in two vertically displaced positions; the latter as elevated by an obstacle $x$, while the upward deflection of the spring $f$ is indicated by the dotted lines $y$, $y'$. Similarly the deflection of the elliptic spring $i$ is shown by two sets of dotted lines $z$, $z'$, which indicate the compression caused directly by the body action.

Analyzing the construction above described, it is seen that it comprises primarily an under-slung frame preferably of wood, which may be very cheaply and rigidly constructed to meet the necessary strains; the same being suspended by relatively long semi-elliptic springs which serve largely to minimize and distribute the vibrations and shocks imparted by the roadway. The body of the vehicle, in turn, is mounted upon this frame by front and rear sets of intermediate elliptic springs, which compensate slightly for the axle action, but primarily accommodate the up and down movement of the body, or body action. By reason of the underslung position of the intermediate frame, together with the support of the body in a plane materially above said frame, by means of the elliptic springs, said body is permitted much freedom of movement with respect to the frame. Its plane of support is such that the body will not telescope within the intermediate frame during the driving of the vehicle, although the body is not materially raised above the plane of the axles. Accordingly, I am enabled to produce a chassis of such inherent, easy-riding qualities that not only is it practicable to eliminate pneumatic tires from the wheels, but the body itself is subjected to far less vibration than with any other system of support known to me. Accordingly, the wood (or, if desired, pressed steel) frame may be cheaply and serviceably constructed to serve intermediately as a shock distributer, and the lives of the running gear and body are correspondingly extended with distinct advantage to the riding qualities of the vehicle.

Having now described the preferred constructions embodying my invention, I claim as new and desire to secure by Letters Patent, the following:—

1. A spring-supported system for vehicles, comprising a rigid under-slung frame, a set of superposed springs whereon said frame is hung, a set of intermediate springs supported by the frame and a vehicle-body mounted upon the last named set of springs in a plane sufficiently elevated above the frame to avoid the telescopic action of the body within said frame, substantially as set forth.

2. In a spring-supported system for vehicles, the combination with a running gear including the vehicle axles, of relatively long semi-elliptic springs mounted adjacent to the ends of said axles, a frame hung from said springs and a plurality of intermediate springs mounted directly upon said frame and independent of the axles, for supporting the vehicle-body in a plane sufficiently elevated above the frame to avoid the telescopic action of the body within said frame, substantially as set forth.

3. In a spring-supported system for vehicles, the combination with the running gear, including the vehicle-axles, of a rigid rectangular wooden frame, sets of semi-elliptic springs supporting said frame below the plane of the axles, sets of intermediate elliptic springs mounted upon the frame, and a vehicle body carried by said intermediate springs in a plane approximately that of the axles, but elevated above said frame, substantially as set forth.

4. In a spring-supported system for vehicles, the combination with the running gear, including the vehicle-axles, of long semi-elliptic springs supported by said axles, a rigid intermediate frame hung below the axles upon said springs and independent sets of springs carried by the frame and adapted to support the vehicle-body in a plane sufficiently elevated above the frame to avoid the telescopic action of the body within said frame, substantially as set forth.

5. In a spring-supported system for vehicles, the combination with the running gear including the vehicle-axles, of relatively long semi-elliptic springs mounted thereon, a rectangular wooden frame hung from said springs, link connections therefor, elliptic front and rear springs superposed upon the frame, and a vehicle-body wholly supported by said elliptic springs in a plane sufficiently elevated above the frame to avoid the telescopic action of the body within said frame, substantially as set forth.

In testimony whereof I do now affix my signature in the presence of two witnesses.

JAMES WEBB SAFFOLD.

Witnesses:
  A. C. KNIGHT,
  ALBERT LYNN LAWRENCE.